United States Patent [19]

Kita

[11] Patent Number: 5,027,227

[45] Date of Patent: Jun. 25, 1991

[54] IMAGE ROTATING DEVICE

[75] Inventor: Sumio Kita, Nara, Japan

[73] Assignee: Sharp Kabushiki Kaisha, Osaka, Japan

[21] Appl. No.: 221,873

[22] Filed: Jul. 20, 1988

[30] Foreign Application Priority Data

Jul. 24, 1987 [JP] Japan ................... 62-186018

[51] Int. Cl.$^5$ ............................................. H04M 1/40
[52] U.S. Cl. ......................................... 358/488; 382/46
[58] Field of Search ........................... 358/488; 382/46

[56] References Cited

U.S. PATENT DOCUMENTS

| 4,545,069 | 10/1985 | Kermisch ............................... 382/46 |
| 4,637,057 | 1/1987 | Kermisch ............................... 340/727 |
| 4,759,076 | 7/1988 | Tanaka et al. ......................... 382/46 |
| 4,817,178 | 3/1989 | Momose et al. ........................ 382/46 |
| 4,829,452 | 5/1989 | Kang et al. ............................ 382/46 |

FOREIGN PATENT DOCUMENTS

| 5154871 | 12/1980 | Japan ................................. 358/488 |
| 58-114563 | 7/1983 | Japan ................................. 358/488 |
| 3500795 | 4/1987 | Fed. Rep. of Germany . |

Primary Examiner—Edward L. Coles, Sr.

[57] ABSTRACT

An image rotating device is described which includes a storage unit for storing image information and a tilt indicating unit for imputting information necessary to corect the tilt of the image information stored in the storage unit. Further, an image processing unit devides the image information, stored in the storage unit, into a plurality of areas according to the information supplied by the tilt indicating unit. It then affects a parallel movement of each area to accomplish the correction of the tilt of the image information.

4 Claims, 4 Drawing Sheets

Fig. 4(a)      Fig. 4(b)
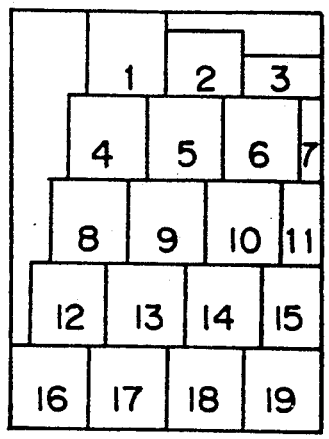    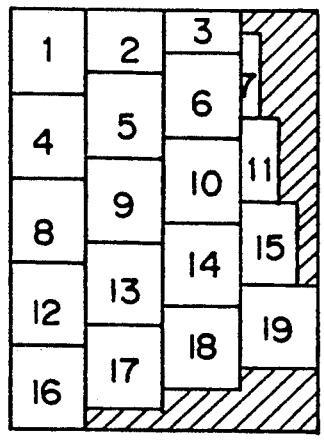
Fig. 5
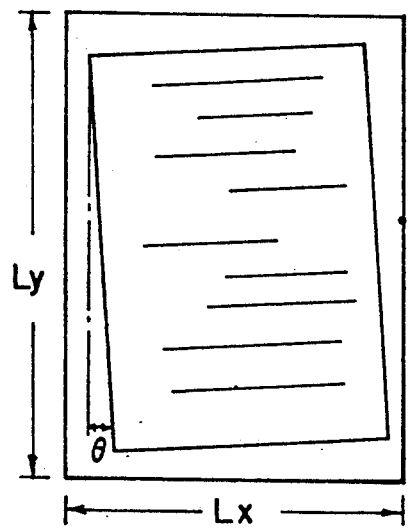
Fig. 7(a)      Fig. 7(b)
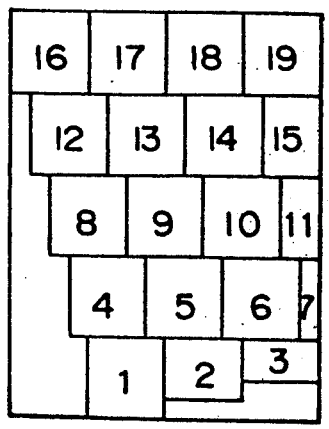    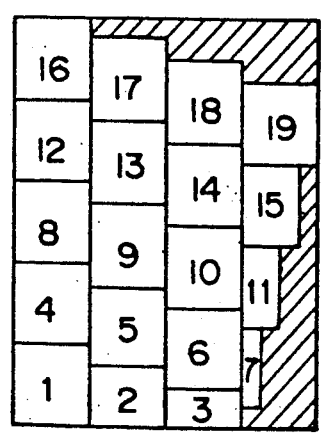

IMAGE ROTATING DEVICE

BACKGROUND OF THE INVENTION

1. Field of the Invention

The present invention relates to an image rotating device for use in a n electronic filing machine or a facsimile machine for correcting a tilt of an image read out by an image reading device, such as a charge-coupled device.

2. Description of the Prior Art

It often occurs that an image read out by the image reading device such as a charge-coupled device, used in the electronic filing machine or the facsimile machine, tilts. In order to correct this tilt of the image, it has long been practiced to rotate each dot according the angle of tilt of the imgae.

However, it has been discovered that the prior art technique, to rotate each dot according to the angle of tilt of the image, requires a relatively long processing time.

SUMMARY OF THE INVENTION

The present invention is based on the finding that, unless the tilt of the image is considerable, it can supersede the strict correction, such as hitherto performed, with no problem occurring in the corrected image. The primary object is to provide an improved image rotating device wherein the tilt of the image is corrected for each area to accomplish a high speed image correction.

In order to accomplish the above described object, the present invention provides an improved image rotating device which comprises a storage device for storing image information, a tilt indicating device for inputting information necessary to correct the tilt of the image information stored in the storage device, and an image processing device, for dividing the image information, stored in the storage means, into a plurality of areas according to the information supplied by the tilt indicating device and It then affects a parallel movement of each area to accomplish the correction of the tilt of the image information.

According to the present invention, the image information stored in the storage device is divided into a plurality of areas, each of the areas being subsequently moved in parallel to correct the tilt of the image, which is stored in the storage device.

BRIEF DESCRIPTION OF THE DRAWINGS

This and other objects and features of the present invention will become clear from the following description taken in conjunction with a preferred embodiment thereof with reference to the accompnying drawings, in which:

FIGS. 4A and 4B are diagrams showing the manner in which the image correction is affected by dividing the rightward tilted image into a plurality of areas;

FIG. 5 is a diagram showing the image tilted leftward;

FIGS. 7A and 7B are diagrams showing the manner in which the image correction is affected by dividing the leftward tilted image into a plurality of areas.

DETAILED DESCRIPTION OF THE EMBODIMENT

Herinafter, one preferred embodiment of the present invention will be described with reference to the accompnaying drawings.

Figure 1:
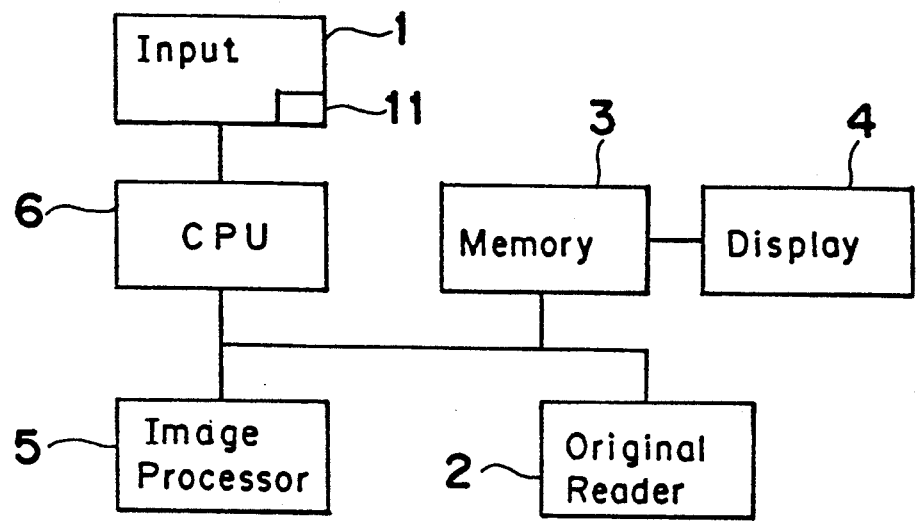
FIG. 1 is a circuit block diagram showing an image rotating device according to a preferred embodiment of the present invention.

Referring first to FIG. 1, an image rotating device shown therein comprises an input device 1 for issuing various commands. It includes a tilt indicating unit 11 adapted to receive and supply information and for executing a command necessary to correct a tilt of an image. The tilt indicating unit 11 may comprise, for example, a tablet, a keyboard and/or a mouse. The device also comprises an original read out unit 2 for reading an original and converting it into image information; a memory unit 3 for storing the image information read out by the original reading unit 2; a display unit 4 comprised of, for example, a cathode ray tube, for displaying the image information stored in the memory unit 3; an image processing unit 5 for performing an image processing according to the tilt correction information supplied from the tilt indicating unit 11; and a central processing unit 6 for controlling the operation of the entire circuitry.

While the image roating device, according to the present invention, is constructe as described above, assuming that the input unit 1 issues a command to read an image, the central processing unit 6 commands the original reading unit 2 to read image information. The image information read out by the original reading unit 2 is written in a predetermined area of the memory unit 3 and, at the same time, read out to the display unit 4 for providing a visual indication of the image information.

An operator of the image rotating device should determine the status of tilt of the image by viewing the image information displayed by the display unit. He should then input information indicating the image needs correction and a command is executed from the tilt indicating unit 11, in the event that the operator determines that the image should be corrected, to remove the tilt.

Based on the input supplied from the tilt indicating unit 11, the central processing unit 6 determines whether the image is tilted rightward or whether it is tilted leftward. At the same time, it casuses the image processing unit 5 to perform the image correction.

Figure 2:
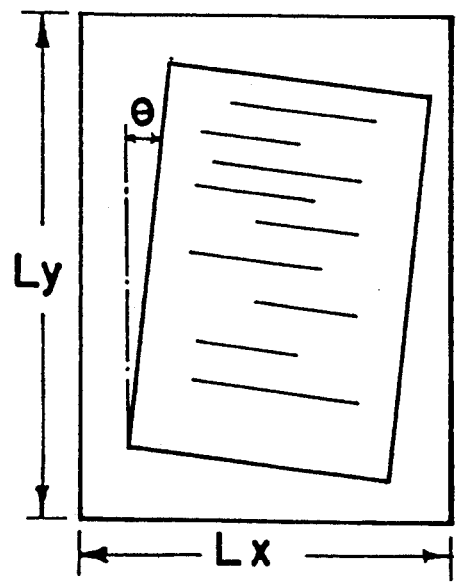
FIG. 2 is a diagram showing an image tilted rightward.

A specific example of the image correction to correct the rightward tilted image as shown in FIG. 2 will be described first.

Figure 3:
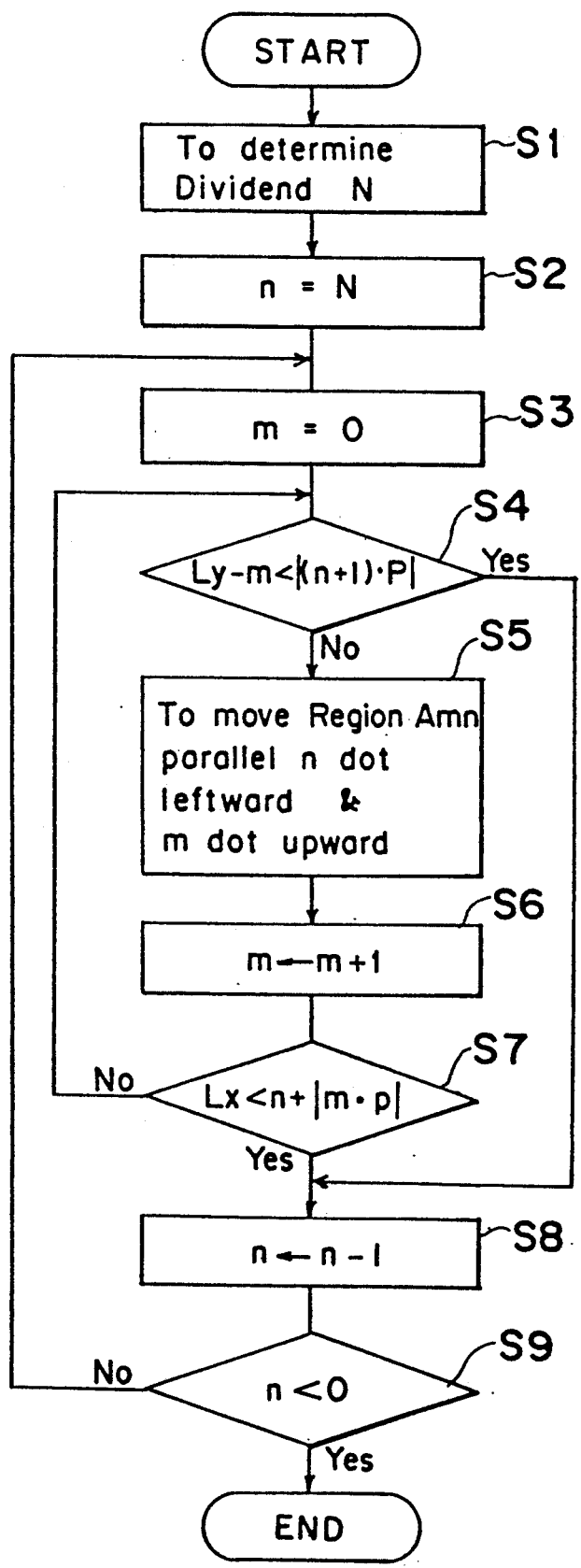
FIG. 3 is a flowchart showing the sequence of steps to correct the tilt of the image shown in FIG. 2.

When two points P1(x1, y1) and P2(x2, y2) descriptive of the tilt are indicated by the tilt indicating unit 11, the central processing unit 6 causes the image processing unit 5 to perform the sequence of operations shown in FIG. 3 to correct the tilt of the image.

Referring to FIG. 3, at step S1, the divisor N is determined. The divisor N is an integer calculated by the following equations.

(I) In the case of $|x2-x1| < |y2-y1|$, $$|Ly \cdot (x2-x1)/(y2-y1)| \tag{1}$$

(II) In the case of $|x2-x1| \geq |y2-y1|$, $$|Lx \cdot (y2-y1)/(x2-x1)| \quad (2)$$

Wherein, if each of the equations (1) and (2) gives a mixed number, digits in the decimal place or places in the mixed number are rounded.

The case (I) will first be described. Assuming that n and m represents an integer and $(y2-y1)/(x2-x1)$ is expressed by P, a region Amn bound by four points in coordinate system, that is, $(n+|m \cdot P|, |n \cdot P|)$, $(n+|(m+1) \cdot P|, |n \cdot P|)$, $(n+|(m+1) \cdot P|, |(n+1) \cdot P|)$, $(n+|m \cdot P|, |(n+1) \cdot P|)$, is moved. Each of the above points in the coordinate system is of a value closest to the integer determined by the above equation and obtained by rounding off or cutting down the digits in the decimal place or places.

At step S2, n is made equal to N, and at step S3, m is made equal to 0. Then, at step S4, a decision is made to determine if the y-axis value of an upper portion of the region Amn, that is, $|(n+1) \cdot P|$, is greater than Ly $-m$. Since $m=0$ and $n=N$ as discussed above, $|(n+1) \cdot P|$ is compared with Ly.

If the result of decision at step S4 indicates that the ordinate value of $|(n+1) \cdot P|$ is greater than Ly, it means that the upper portion of the region Amn exceeds Ly Therefore, the program flow proceeds to step S8 at which n is decremented by one, that is, $n=N-1$. Subsequent to Step 8, step 9 takes place at which another decision is made to determine if n is smaller than 0. Unless n is smaller than 0, the program flow returns to step S3 to make m equal to 0, followed by step S4.

The above described program flow is repeated until the ordinate value of $|(n+1) \cdot P|$ of the upper portion of the region Amn is no longer greater than Ly. Step S5 takes place when the ordinate value of $|(n+1) \cdot P|$ of the upper portion of the region Amn is no longer greater than Ly.

At step S5, the region Amn is moved n dots in the negative direction of the x-axis (in a leftward direction) and m dots in the positive direction of the y-axis (in an upward direction). Since $m=0$, the region Amn is moved n dots in the leftward direction. By so doing, an area 1 shown in FIG. 4(a) is moved to an area 1 shown in FIG. 4(b).

At step S6, m is incremented by 1. In other words, m is rendered to be 1, followed by the processing of an area 2 shown in FIG. 4(a). Thereafter, step S7 takes place wherein a decision is made to determin if the ordinate value $n+|m \cdot P|$ of a left hand portion of the region Amn is equal to $Lx < n+|m \cdot P|$. If the result of decision indicates that it is not equal to $Lx < n+|m \cdot P|$, the program flow return to step S4. Should the result of decision at step S4 does not indicate $Ly-m<|(n+1) \cdot P|$, the area 2 referred to above is moved parallel n dots in the leftward direction and $m=1$ dot in the upward direction. By so doing, the area 2 shown in FIG. 4(a) is moved to an area shown in FIG. 4(b). Subsequently, step S6 takes place to increment m by one thereby performing a processing with respect to an area 3 shown in FIG. 4(a).

In the foregoing process, either when Lx is smaller than $n+|m \cdot P|$ as determined at step S7, or when $Ly-m<|(n+1) \cdot P|$ as determined at step S4, the program flow proceeds to step S8 at which time n is decremented by one so that a processing with respect to an area 4 shown in FIG. 4(a) can take place.

Where the x-axis ordinate value $|n+(m+1)a19 P|$ is greater than Lx: the x-axis ordinate is rendered to be Lx, where the y-axis ordinate value $|(n+1) \cdot P|$ is greater than Ly$-m$ (an area at the upper region of the image), the y-axis ordinate is rendered to be Ly$-m$. Also, if $n<0$ as determined at step S9, the processing is terminated.

In the manner described above, a similar processing is performed to move the image shown in FIG. 4(a) parallel to correct the tilt of the image as shown in FIG. 4(b). Subsequently, hatched areas shown in FIG. 4(b) are cleared.

Where $|x2-x1| \geq |y2-y1|$ (the case (II)), by rendering P to be equal to $|(x2-x1)/(y2-y1)|$, the tilt correction can be performed in a manner similar to that described above in connection with the case (I).

Where the image is tilted leftward as shown in FIG. 5, the tilt correcion can be accomplished in the following manner.

Figure 6:
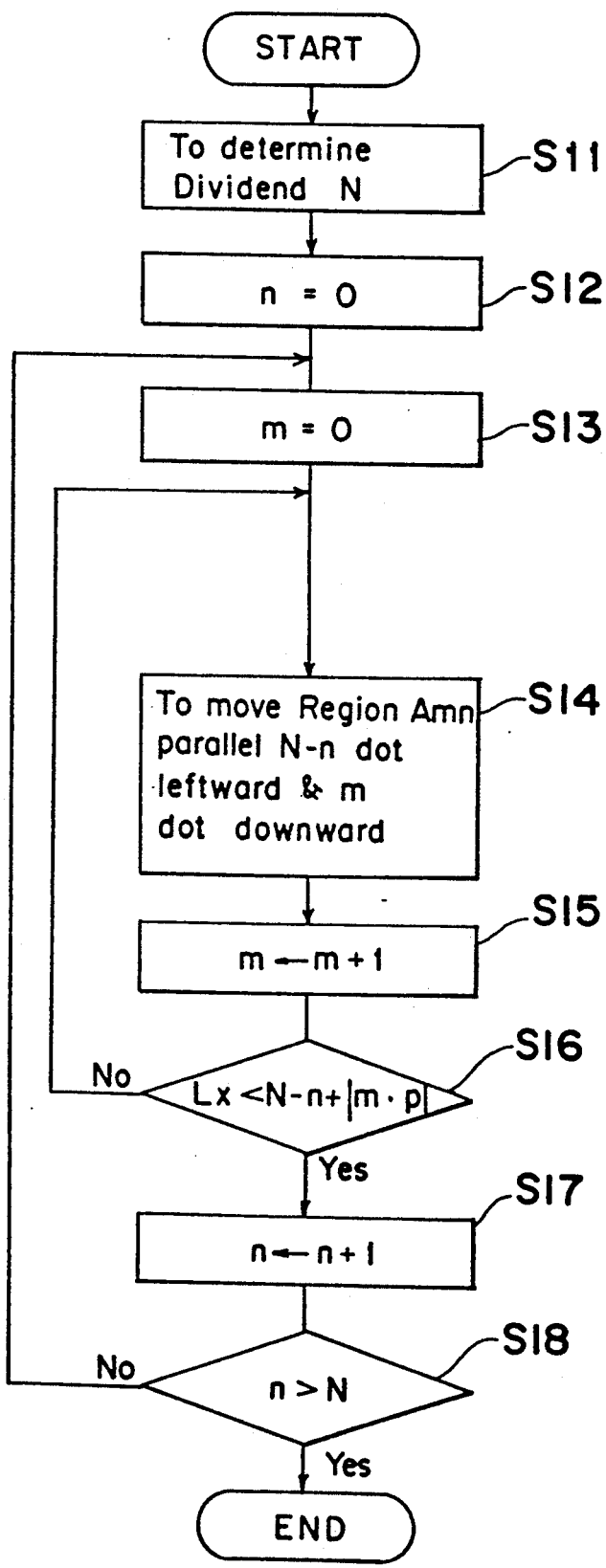
FIG. 6 is a flowchart showing the sequence of steps to correct the tilt of the image shown in FIG. 5.

When two points in ordinate system, P1(x1, y1) and P2(x2, y2), descriptive of the tilt, are indicated by the tilt indicating unit 11 as is the case with that described in connection with FIG. 2, the central processing unit 6 causes the image processing unit 6 to perform an image correction according to the flowchart shown in FIG. 6. At step S11, the divisor N is determined. The divisor N is an integer calculated by the following equations.

(I') In the case of $|x2-x1|<|y2-y1|$, $$|Ly \cdot (x2-x1)/(y2-y1)| \quad (1)$$

(II') In the case of $|x2-x1| \geq |y2-y1|$, $$|Lx \cdot (y2-y1)/(x2-x1)| \quad (2)$$

Where each of the equations (1) and (2) gives a mixed number, digits in the decimal place or places in the mixed number are rounded.

Assuming that n and m to are a respective integer and $(y2-y1)/(x2-x1)$ (in the case(I')) or $(x2-x1)/(y2-y1)$ (in the case (II')) is expressed by P, a region Amn bound by four points in coordinate system, that is, $(N-n+|m \cdot P|, |n \cdot P|)$, $(N-n+|(m+1) \cdot P|, |n \cdot P|)$, $(N-n+|(m+1) \cdot P|, |(n+1) \cdot P|)$, $(n+|m \cdot P|, |(N-n+1) \cdot P|)$, is moved. Each of the above points in coordinate system is of a value closest to the integer detemined by the above equation and obtained by rounding of or cutting down the digits in the decimal place or places.

At step S12, n is made equal to 0, and at step S13, m is made equal to 0. In this case, since the processing starts from the bottom portion of the image as shown in FIG. 7, no decision step such as performed at step S3 in the flowchart of FIG. 3 is necessary. Therefore, the step following step S13 is step S14 wherein the region Amn is moved parallel N$-n$ dots in a negative direction of the x-axis (in a leftward direction) and m dots in a negative direction of the y-axis (in a downward direction). After m has been incremented by one at step S15, a decision is made at step S16 to determine if the coordinate value $N-n+|(m \cdot P|$ of a left end of the region Amn is greater than Lx. Should the result of decision at step S16 indicate that $N-n+|(m \cdot P|$ is not greater than Lx, the program flow returns to step S. 14. However, if it indicates that $N-n+|(m \cdot P|$ is greater than Lx, step S17 takes place. After n has been incremented by one at step S17, another decision is made at step S18 to determine if n is greater than N. If n is not greater than N, the program flow returns to step S13. However, if n is greater than N, the processing is terminated. It is to be noted that, where the x-axis coordinate value $|(N-n+(m+1)\cdot P|$ is greater than Lx, the x-axis coordinate value is rendered to be Lx. Further, where the y-axis coordinate value $|(n\cdot P|$ is smaller than m (the bottom area of the image), the y-axis coordinate value is rendered to be m.

In the manner described above, the image shown in FIG. 7(a) can be moved parallel to correct the tilt of the image as shown in FIG. 7(b). Subsequently, hatched areas shown if FIG. 7(b) are cleared.

As hereinbefore described, since the tilt of the image is corrected for each region Amn, the tilt correction can be accomplished at a higher speed as compared with the case in which the angle of tilt is corrected by rotating for each dot.

While the foregoing desciption has been directed to the tilt correction of the entire image information, the present invention is not always limited thereto. It may also be applicable to the case in which the tilt of only a portion of the image information is desired to be corrected.

Also, although reference has been made to one example of a method of division of the region Amn, the present invention is not always limited to the use of such method of division: Any method effective to divide the region Amn may be employed.

From the foregoing description of the present invention, it has now become clear that, since the image rotating device according to the present invention is operable in such a manner that information necessary to correct the tilt of image information stored in the storage device is inputted by the tilt indicating means to cause the image processing device to divide, in response to the information inputted from the tilt indicating device, the image information into a plurality of areas and move each area in parallel for each area thereby to correct the tile of the image information stored in the storage device the tile of the image can be corrected at high speed.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image rotating apparatus comprising:
   storage means for storing image information read from an original image;
   tilt indicating means for inputting information based on a plurality of points indicating a angle of tilt of the original image from a display corresponding to the original image;
   image processing means for dividing the image information, stored in the storage means, into a plurality of areas according to the information supplied by the tilt indicating means, and for shifting each of the plural areas, in a parallel manner, to accomplish correction of the tilt of the image information; and
   central processing means, connecting said tilt indicating means and said image processing means, for receiving said angle of tilt information from said tilt indicating means and determining whether the original image is tilted rightward or leftward.

2. An apparatus, as claimed in claim 1, wherein said rightward or leftward tilt information, from said central processing means, is supplied to said image processing means and is utilized in accomplishing the correction of the tilt of the image information.

3. An apparatus, as claimed in claim 2, wherein said image processing apparatus shifts said plural areas leftward and upward when said central processing means supplies rightward tilt information, and shifts said plural areas leftward and downward when said central processing means supplies leftward tilt information.

4. An apparatus as claimed in claim 1, wherein said plurality of points equals two (2), each of which has an X and a Y coordinate.

* * * * *